UNITED STATES PATENT OFFICE.

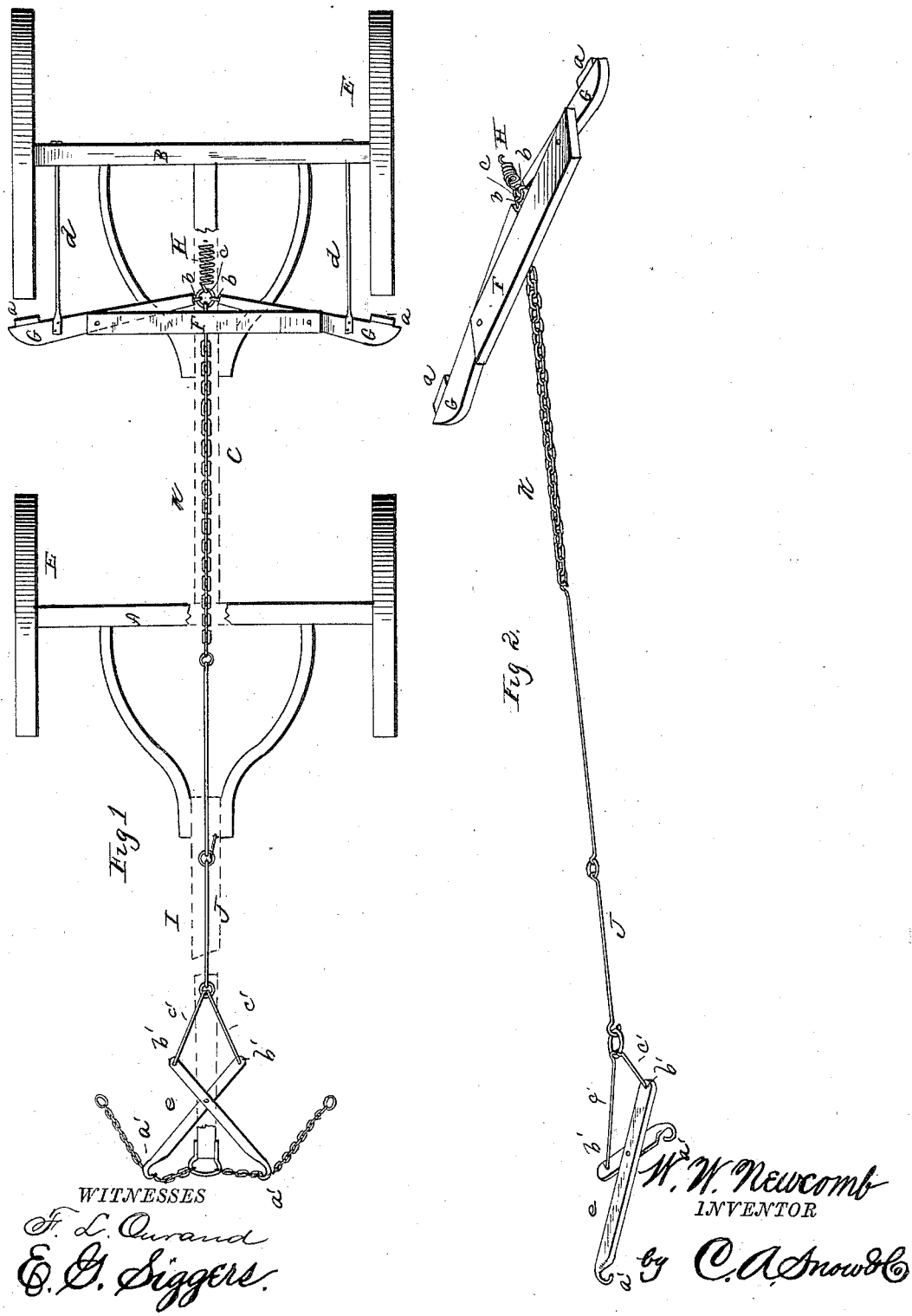

WILLIAM W. NEWCOMB, OF BRADFORDSVILLE, KENTUCKY.

VEHICLE-BRAKE.

SPECIFICATION forming part of Letters Patent No. 302,861, dated July 29, 1884.

Application filed April 3, 1884. (No model.)

*To all whom it may concern:*

Be it known that I, WILLIAM W. NEWCOMB, a citizen of the United States, residing at Bradfordsville, in the county of Marion and State of Kentucky, have invented a new and useful Vehicle-Brake, of which the following is a specification, reference being had to the accompanying drawings.

My invention relates to vehicle-brakes; and it has for its object to provide a brake whereby, upon the descending of a hill, the team will automatically cause the brakes to come in contact with the wheels, and in this manner lessen the speed of the descent and any strain upon the horses.

A further object of the invention is to provide a device of this character which shall be simple in its construction, and one that may be readily operated.

With these ends in view the invention consists in the improved construction and combinations of parts hereinafter fully described, and pointed out in the claims.

In the drawings, Figure 1 is a plan view of the running-gear of an ordinary wagon, showing my improvements applied thereto. Fig. 2 is a detached detail view of the brake and means for attaching the same.

In the accompanying drawings, in which like letters refer to corresponding parts in the several figures, A represents the forward axle, B the rear axle, D the connecting-hounds, and E the wheels, of an ordinary wagon. Upon the hounds, near the rear axle, is provided a cross-beam, F, upon which are pivoted the brakes G. These brakes G are provided at their ends, at the point where they engage the wheel, with shoes $a$, and are provided on their inner ends with staples $b$, connected by a ring, $c$. Near the outer ends of the brakes G are provided rods $d$, which pass through openings in the rear axle, and are provided with headed ends to prevent their disengagement from said axle. It will be seen that by the use of these rods the ends of the brakes G are properly supported, and which limit the forward movement of the brakes, as will be described.

H represents a coil-spring, which is secured to the rear axle at one end, and is connected at its other end with the ring which connects the two brakes by engaging the staples thereof. By this construction it will be seen that when pressure has been released from the brakes the same will be withdrawn from contact with the wagon-wheels by means of the said spring.

I represents the tongue, upon the forward end and upon the under side of which are pivoted two levers, $e$, which are crossed, as shown, and their ends provided with hooks $a'$, adapted to engage the chains which are usually provided on the end of a draft-tongue. The ends of the levers $e$ are provided with perforations or openings $b'$, in which are secured two rods, $c'$, connected at their other ends by means of a ring, which has secured to it a rod, J, which is jointed at about the point where the pole or tongue joins the wagon by means of a ring, and is then connected to a chain, K, which is secured at its other end to the brakes.

The operation of my invention is as follows: The levers $e$ are hooked to the chain which is secured to the end of the tongue, said chain being secured at their other ends to the hames of the team. It will be seen that in descending an incline or hill the tendency of the wagon is to descend at a rapid rate of speed, and the horses, by holding back, draw out or spread apart the levers $e$, which draw the several rods and chains connected to the brakes forward, and in this manner cause the shoes to bear against the wheels and effectually stop the too rapid descent of a wagon. When the team reaches level ground and it is necessary to apply draft to propel the wagon, the power is released on the levers $e$, and the coil-spring exerts power and withdraws the brake-shoes from contact with the wheels. Upon the tongue of the axle, at the point where the rod is jointed, is provided a hook which is adapted to engage the ring at the junction, and in this manner the brakes may be cut off.

Having fully described my invention, what I claim as new, and desire to secure by Letters Patent, is—

1. The combination, with the hounds of a wagon, of brakes G, pivoted to a beam, F, a ring connecting said brakes at their inner ends, a coil-spring, H, secured to said ring and to the reach-pole, rods $d$, secured to said brakes near their outer ends, and working in openings of the axle B, a chain secured to the ring c, a jointed rod connecting said chain with toggle-levers secured to the under side of the vehicle-tongue, and a hook adapted to engage said rod at one of its joints, substantially as and for the purpose set forth.

2. The combination, with the tongue of a wagon, of toggle-levers pivoted thereto, said levers having hooked ends adapted to engage the holdback-chains, substantially as set forth.

In testimony that I claim the foregoing as my own I have hereto affixed my signature in presence of two witnesses.

WILLIAM W. NEWCOMB.

Witnesses:
WM. SEVERANCE,
J. A. BOWMAN.